Patented June 19, 1951

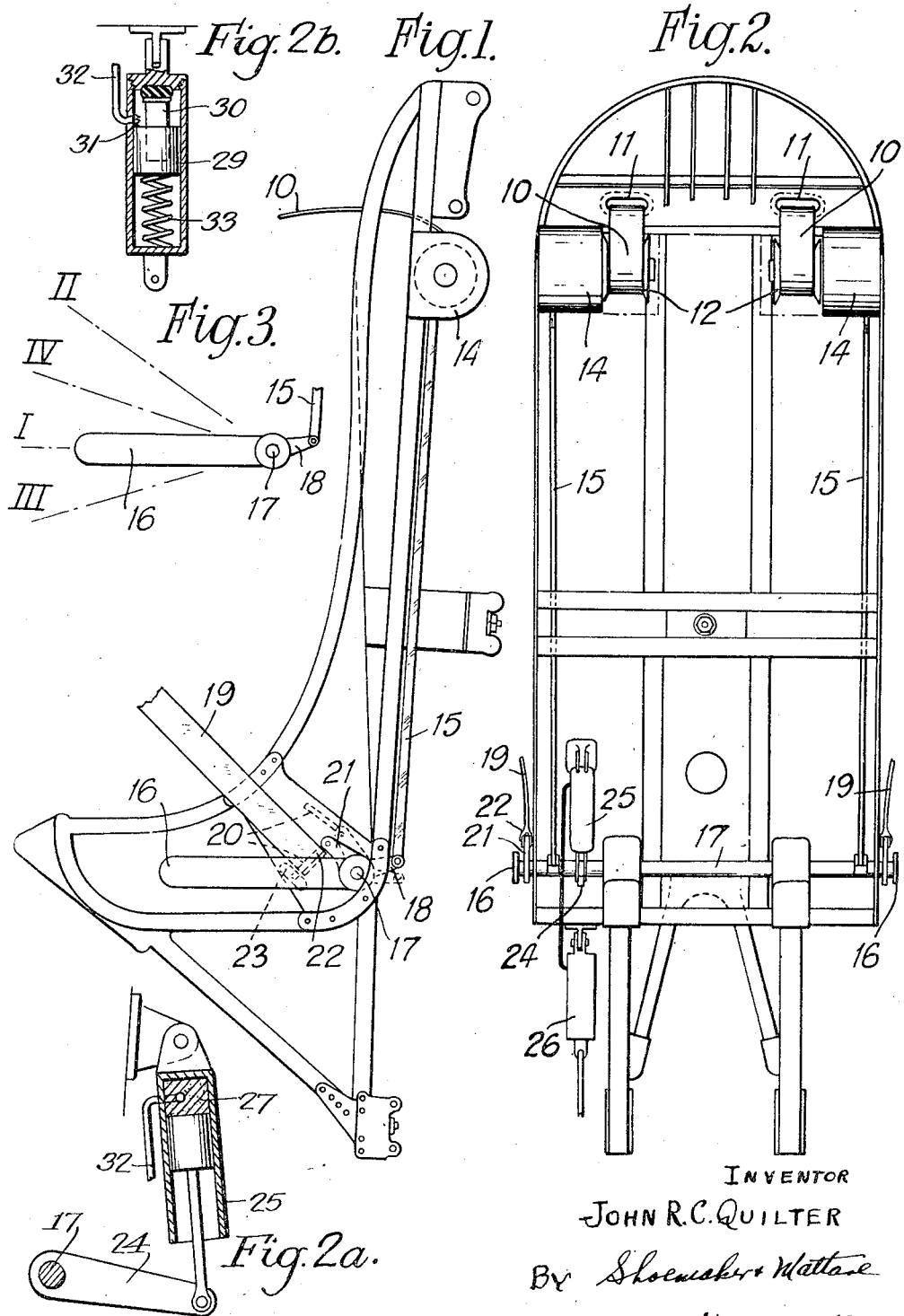

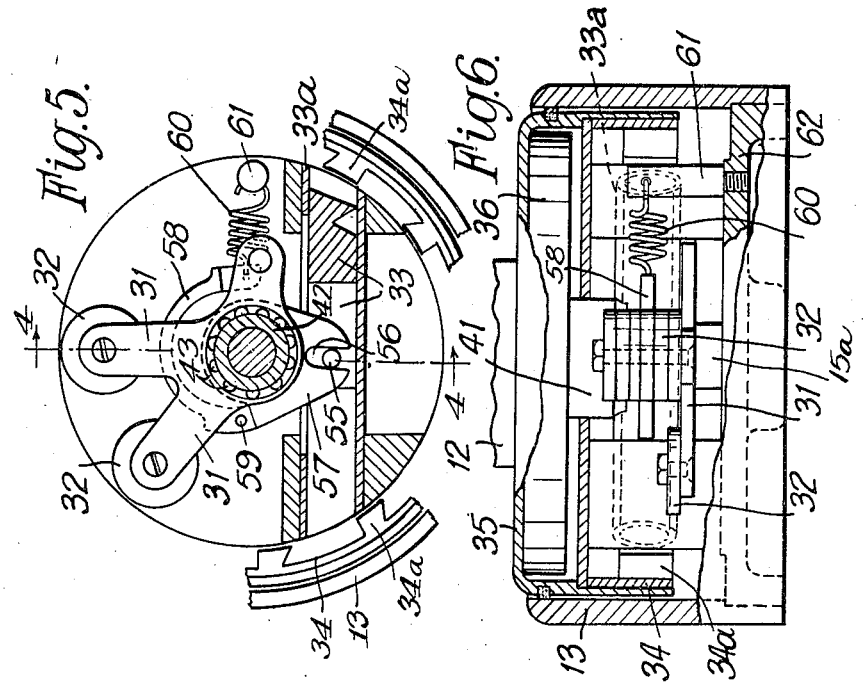
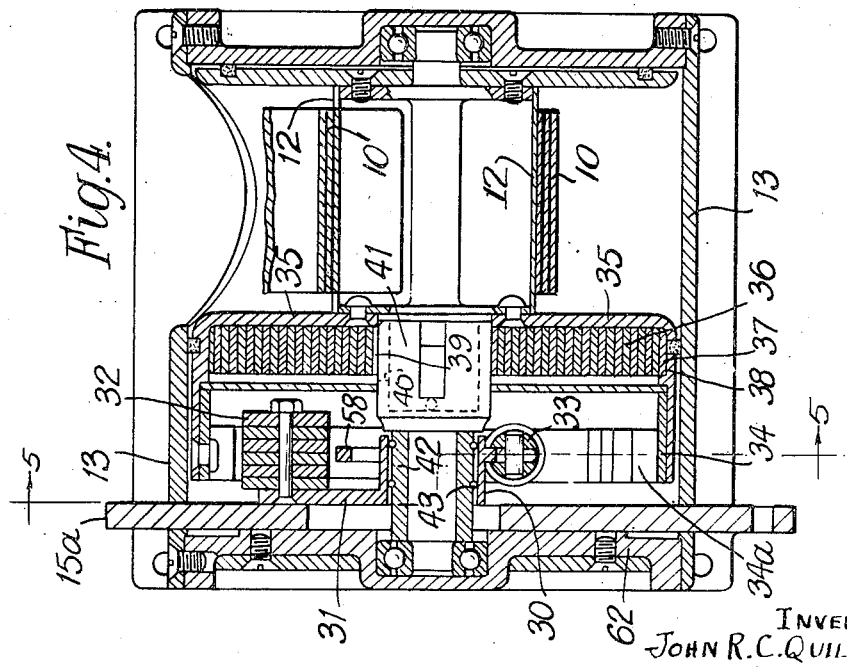

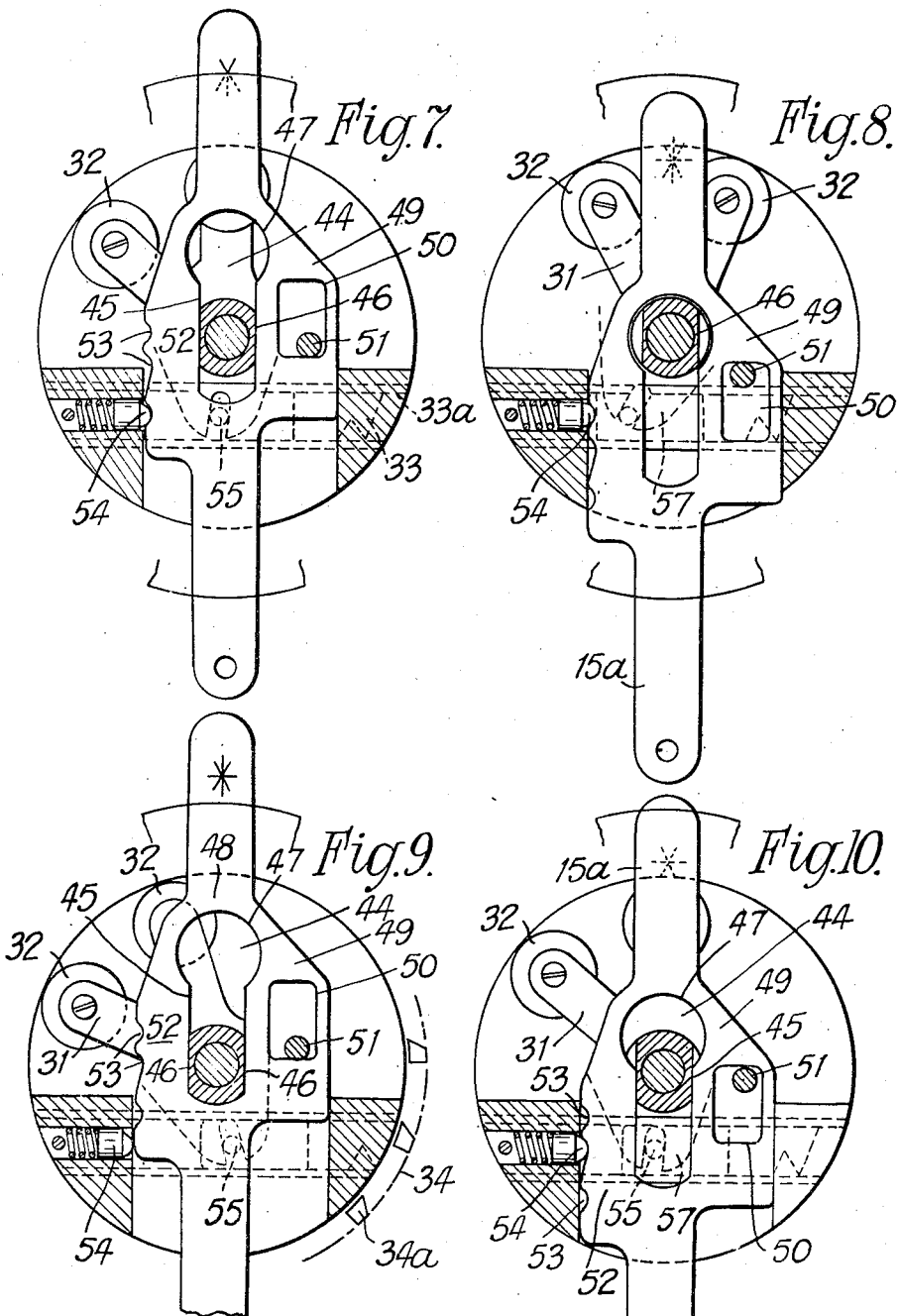

2,557,313

UNITED STATES PATENT OFFICE 2,557,313

SAFETY DEVICE FOR CHAIRS

John Raymond Cuthbert Quilter,
Woking, England

Application January 6, 1947, Serial No. 720,451
In Great Britain January 8, 1946

6 Claims. (Cl. 155—189)

This invention relates to safety or retaining devices for seats on aircraft and other vehicles such as racing motor cars, in which it is customary to provide safety straps or harness for retaining the pilot or other occupant in his seat in spite of shocks, collisions or the like.

The invention has for its main object the provision of an improved safety device of this character, which allows definite freedom of movement without any material restriction by the safety straps or harness, so that the pilot of an aircraft for example can move about on his seat or to a limited extent within the cockpit, but in the event of a sudden shock the safety device will operate to retain him in his seat by holding the safety straps or harness tight until the effects of the shock are at least partially removed. The invention is particularly applicable to aircraft seats of the automatic ejection type but may also be applied to normal seats of aircraft or other vehicles.

A further object of the invention is to provide one or more inertia locks which will allow the harness to yield to the voluntary movements of the pilot or other occupant in relation to his seat, but will hold the harness tightly against sudden pulls due to shocks or the like. Automatic means may be provided for freeing the harness within a predetermined period after a shock which has been sufficiently severe to bring the inertia lock into operation; thus, the pilot will regain his freedom of movement after the shock has passed; or again, in the case of an automatic ejection seat on an aircraft, the shock caused by the ejection of the pilot with his seat will lock the safety harness so as to maintain him upon the seat but after a suitable delay he will be freed automatically from the seat so that he may bring his parachute into operation.

Another object is to provide means for freeing the safety straps or harness manually at any time; these manual controlling means may be arranged to have one or more additional operative positions whereby the harness may be locked definitely and irrespective of shocks for example before entering into aerobatics or violent movements of the aircraft.

Other objects and advantages of the invention will appear from the following description, given with reference to the accompanying diagrammatic drawings, in which:

Fig. 1 is a side view of an aircraft pilot's seat.
Fig. 2 is a rear view of the seat.
Figs. 2a and 2b are views in axial section on a larger scale of two details seen in Fig. 2.
Fig. 3 shows the four positions of the manual control lever.
Fig. 4 is a sectional view of an inertia locking device, as seen on the line 4—4 of Fig. 5.

Fig. 5 is an end view partly in section on the line 5—5 of Fig. 4, showing the rocker and connected parts of the inertia locking device.
Fig. 6 is a plan of Fig. 5, parts of the locking device and its housing being broken away.
Figs. 7 to 10 are end views of the rocker and connected parts of the inertia locking device in the four positions corresponding to the four positions of the control lever marked in Fig. 3.

In the embodiment of the invention illustrated in Figs. 1 and 2, as applied to an aircraft seat, the safety harness includes two straps 10 which pass over the occupant's shoulders and through guide slots 11 in the back of the seat, where they are wound upon drums 12 mounted in housings 13 below the slots, each drum receiving one of the straps tangentially and in a substantially horizontal direction. The straps are detachably engaged with the drums, for example by inserting their free ends 10' into longitudinal slots 12' in the hubs of the drums, the straps being then wound upon the hubs until they are drawn tight, the superposed coils holding the inner ends in the engaged position, as seen in Fig. 4.

Upon the shaft of each drum, inside the housing 13, there is fitted an inertia locking device 14, the operation of this device being such that while tending to wind in the respective strap 10 under a spring tension of about three pounds for example, and allowing the strap to pay out slowly against that tension, it will hold the strap tightly if the speed of outward movement exceeds a certain rate. Thus, if the pilot leans forward in his seat, the straps 10 of the safety harness will yield to this movement, and when he leans back the inertia locking devices 14 will wind in the two straps so as to take up the slack, but if a sudden shock tends to throw the pilot out of his seat, the movement will be resisted by a strong braking action or a positive lock which will prevent the safety straps from yielding.

The inertia device, as illustrated in Figs. 4 to 6, may comprise a rocker 30 mounted freely upon the drum shaft and provided with one or more moment arms 31 carrying lead weights 32, so that under the influence of forward or upward acceleration the rocker 30 turns about the shaft, thus forcing a bolt 33, brake shoe or the like into internal engagement with the rim of a wheel 34 secured to the drum on which the strap 10 is wound. This wheel is shown fitted inside a cylindrical extension of one of the end flanges 35 of the drum which houses a clock spring 36 having its outer end 37 engaged in a longitudinal slot 38 in the peripheral portion of the extension and its inner end 39 hooked into a slot 40 in a sleeve or coupling member 41 keyed upon the shaft and normally coupled to a second sleeve or coupling member 42 providing a ball-race support at 43 for the freely mounted rocker 30. This second coupling member is controlled by a rod 15 running substantially vertically behind the seat and jointed at its upper end to a bar 15a slidable diametrically through the housing 13; the bar 15a is formed with a keyhole slot 44 engaging the second coupling member 42, whereby the latter may be held stationary by the narrow portion 45 of the slot making contact with two opposite flats 46 upon the coupling member, or allowed to revolve freely by bringing the enlarged circular portion 47 of the slot into register with the coupling member.

The control bar 15a is preferably formed with a widened portion 48 around the keyhole slot, one wing 49 of this widened portion having a rectangular aperture 50 engaging with a crank pin 51 upon the rocker 30, so that the longitudinal movement of the control rod and bar may also be employed to force the rocker to turn in either direction for producing or for releasing the braking or locking action. The opposite wing 52 of the widened portion of the bar may have a series of notches 53, engaged by a spring latch 54 or the like, for locating it in the respective positions to control the inertia lock device.

The operation of the bolt 33 by movement of the rocker 30 is effected through a pin 55 mounted in the forked rear end of the bolt, the pin being engaged by a slot 56 in an arm 57 extending from the body of the rocker; in the normal position, as shown in Fig. 5, the rocker arm 57 holds the bolt inward of its guide-tube 33a, the front end of the bolt being thus clear of the wheel 34. On the other hand, movement of the rocker in the anti-clockwise direction (as viewed in Fig. 5) will force the bolt 33 to the right, thus bringing its front end outwards into engagement with the wheel 34, the interior of which is provided with rack teeth 34a; these teeth are preferably undercut on one face, as shown, and the front end of the bolt is also provided with an undercut tooth so as to take a positive hold of the wheel when engagement occurs. The spacing of the teeth 34a is such as to allow room for the entrance of the bolt-end between two adjacent teeth when the bolt is forced out by the rocker arm 57.

The rocker 30 is biased by a curved link or bail 58 pivoted upon a pin 59 on one side of the rocker, the bail extending over the hub of the rocker and being connected to one end of a coiled tension spring 60, the other end of which is anchored upon a post 61 screwed into an end-plate 62 secured in the housing 13. The pull exerted upon the pin 59 by the spring 60 tends to maintain the rocker 30 in its normal position, until a sudden shock causes the weights 32 under the influence of their inertia to turn the rocker upon its bearing 43 on the outside of the coupling member 42, the turning movement taking place in the anti-clockwise direction (as viewed in Fig. 5); as soon as this happens, the pull of the spring 60 is transferred to the opposite side of the rocker axis, so as to make the slotted arm 57 thrust the bolt 33 outwards into engagement with the wheel 34, with the result of locking the wheel and holding the strap 10 tight, as hereinbefore described.

A return movement of the rocker in the clockwise direction (as viewed in Fig. 5), produced by action of the control rod and bar upon the crank pin 51, will restore the pull of the spring 60 to the original side of the rocker axis, thus again biassing the rocker in its normal position.

Manual control of the safety harness is provided by a hand lever 16 mounted upon one end of a shaft 17 extending transversely of the seat and near the base thereof, each of the control rods 15 engaging with a crank arm 18 secured to the shaft.

The hand lever 16, which may be duplicated by a similar lever at the other end of the shaft 17, can occupy any one of four positions corresponding to the several positions of the control bars 15a; in the normal position, with the lever 16 horizontal on the line I (Fig. 3), the inertia lock device has its second coupling sleeve held by the narrow portion 45 of the keyhole slot in the control bar, as shown in Fig. 7, and the inertia lock will operate to resist sudden movements of the strap 10 due to shocks. In the fully raised portion of the lever on the line II (Fig. 3), the control bar will bring the enlarged circular portion 47 of its slot into register with the coupling sleeve; the inertia lock will thus be freed, as shown in Fig. 8, and the harness can be released at will. By forcing the lever 16 down below the horizontal to the line III (Fig. 3), the pilot can cause the control bar to operate the crank pin 51 of the rocker in the inertia lock devices, thereby forcing the bolt 33 or the like into engagement with the wheel, as shown in Fig. 9; the strap 10 will thus be locked against movement, irrespective of speed, as may be desirable in certain conditions. Lastly, by raising the lever to the position IV (Fig. 3), above the horizontal but short of the fully raised position II, the control bar can be made to turn the rocker 30 back to the normal position, as shown in Fig. 10, thus preparing the device for normal operation as soon as the lever is returned to the horizontal on the line I.

The harness may also include a pair of leg-straps 19, which are fastened at one end to the respective sides of the seat and can be passed beneath the thighs to bring the other ends over into engagement with hinged pegs or levers 20 carried by another pair of cranks 21 upon the shaft 17; these pegs 20 pass through eyes or loops 22 at the ends of the leg-straps and their extremities fit into housings 23 on the sides of the seat frame. The release of the harness by turning the shaft 17 will withdraw the pegs 20 from their housings and allow them to pivot so as to slip out of the eyes or loops 22, thereby freeing the leg-straps. At the same time, the shaft 17 will pull down the control rods 15 connected to the inertia locks, which will allow the free rotation of the two strap-drums.

In the case of an automatic ejection seat on an aircraft, means may also be provided for an automatic release of the safety harness by an emergency actuator consisting for example of a piston connected to another crank 24 upon the control shaft 17, the piston being enclosed in a cylinder 25 secured to the back of the seat, as shown in Fig. 2. This cylinder, as shown in Fig. 2a, contains a small charge of explosive 27, which can be fired within the cylinder in order to drive down the piston 28 for turning the control shaft by means of the crank 24, the charge being ignited electrically by an inertia switch 26. As shown in Fig. 2b, this switch includes a slidable piston 29 into which there is rigidly fixed a dry cell 30 adapted to complete and energize an electrical circuit through an igniter 31 for setting off a fuze 32; this piston is normally held up by a buffer spring 33, which yields to the inertia of the piston when the seat is ejected. The fuze 32 is set with a sufficient delay action to allow the pilot and seat to get clear of the aircraft before the explosive 27 is detonated and the release of the safety harness takes place.

The safety harness straps 10, which may be secured to a waist belt or other suitable part of the parachute harness, will be passed through the guide slots 11 over the shoulders of the pilot or other occupant, after he has taken his seat with the leg straps 19 drawn loosely up between his thighs; the upper straps 10 will then be engaged with their drums and the latter rotated to wind up the straps to the desired tightness. The leg straps 19 will next be laid out over the thighs and their free ends engaged with the pegs or hitch levers 20 on the control shaft 17, the latter being then turned forward into the horizontal position to bring the extremities of the pegs 20 into their housing 23. At the same time, the turning of the shaft 17 lifts the vertical control rods 15 to bring the rockers to their normal position.

By the expressions "strap" and "drum," as employed in the appended claims, there are to be understood any equivalent members, such as ropes, wires or other tensile connections, and wheels, pulleys or the like, respectively.

What I claim is:

1. A safety device comprising means for retaining the occupant of a seat thereon, said retaining means including a strap extending to the rear of said seat, a rotatable drum, said strap being wound upon said drum, spring means for turning said drum in a direction to wind up said strap, a stationary housing for said drum, a bolt slidable within said housing for movement into and out of locking engagement with said drum, a rocker mounted in said housing and controlling the movement of said bolt, said rocker being made operative to move said bolt in the direction of engagement with said drum by inertia force in the event of a sudden movement of said seat, and manually operable means for reversing said rocker to free said drum from said bolt.

2. A safety device comprising means for retaining the occupant of a seat thereon, said retaining means including a strap extending to the rear of said seat, a rotatable drum, said strap being wound upon said drum, spring means for turning said drum in a direction to wind up said strap, a stationary housing for said drum, a bolt slidable within said housing for movement into and out of locking engagement with said drum, a spring-biased rocker mounted in said housing and controlling the movement of said bolt, said rocker being made operative by its spring-bias upon displacement by inertia force in the event of a sudden movement of said seat, and means for reversing said spring-biased rocker to free said drum from said bolt, the spring-bias of said rocker then holding said bolt clear of said drum.

3. A safety device comprising means for retaining the occupant of a seat thereon, said retaining means including a strap extending to the rear of said seat, a rotatable drum, said strap being wound upon said drum, spring means for turning said drum in a direction to wind up said strap, means for holding said drum against rotation, said holding means being made operative by inertia force in the event of a sudden movement of said seat, a control shaft mounted transversely behind said seat, a hand lever for turning said control shaft, a crank secured upon said control shaft, and a connection from said crank to said holding means, the actuation of said control shaft by said hand lever being adapted to free said drum from said holding means.

4. A safety device comprising means for retaining the occupant of a seat thereon, said retaining means including a strap extending to the rear of said seat, a rotatable drum, said strap being wound upon said drum, spring means for turning said drum in a direction to wind up said strap, means for holding said drum against rotation, said holding means being made operative by inertia force in the event of a sudden movement of said seat, a control shaft mounted transversely behind said seat, a hand lever for turning said control shaft, a crank secured upon said control shaft, and a connection from said crank to said holding means, selective setting of said control shaft by said hand lever being adapted to place said drum under inertia-force control by said holding means or to free said drum from said holding means.

5. A safety device comprising means for retaining the occupant of a seat thereon, said retaining means including a strap extending to the rear of said seat, a rotatable drum, said strap being wound upon said drum, spring means for turning said drum in a direction to wind up said strap, means for holding said drum against rotation, said holding means being made operative by inertia force in the event of a sudden movement of said seat, a control shaft mounted transversely behind said seat, a hand lever for turning said control shaft, a crank secured upon said control shaft, and a connection from said crank to said holding means, selective setting of said control shaft by said hand lever being adapted to place said drum under inertia-force control by said holding means, to free said drum from said holding means or to render said holding means operative irrespective of any sudden movement of said seat.

6. A safety device comprising means for retaining the occupant of a seat thereon, said retaining means including a strap extending to the rear of said seat, a rotatable drum, said strap being wound upon said drum, spring means for turning said drum in a direction to wind up said strap, means for holding said drum against rotation, said holding means being made operative by inertia force in the event of a sudden movement of said seat, a pair of leg straps each fastened at one end to said seat, a control shaft mounted transversely behind said seat, a hand lever for turning said control shaft, cranks secured upon said control shaft, a connection from one of said cranks to said holding means, and locking members carried by two others of said cranks for engaging the other ends of said leg straps, the actuation of said control shaft by said hand lever being adapted to free said drum from said holding means and to release said locking members from said leg straps.

JOHN RAYMOND CUTHBERT QUILTER.

REFERENCES CITED

The following references are of record in the file of this patent:

UNITED STATES PATENTS

| Number | Name | Date |
|---|---|---|
| 1,270,636 | McDaniel | June 25, 1918 |
| 1,948,158 | Barr | Feb. 20, 1934 |
| 2,195,334 | Lethern | Mar. 26, 1940 |
| 2,292,386 | Manson | Aug. 11, 1942 |
| 2,394,523 | Pancoe | Feb. 5, 1946 |
| 2,403,653 | Geohegan | July 9, 1946 |